UNITED STATES PATENT OFFICE.

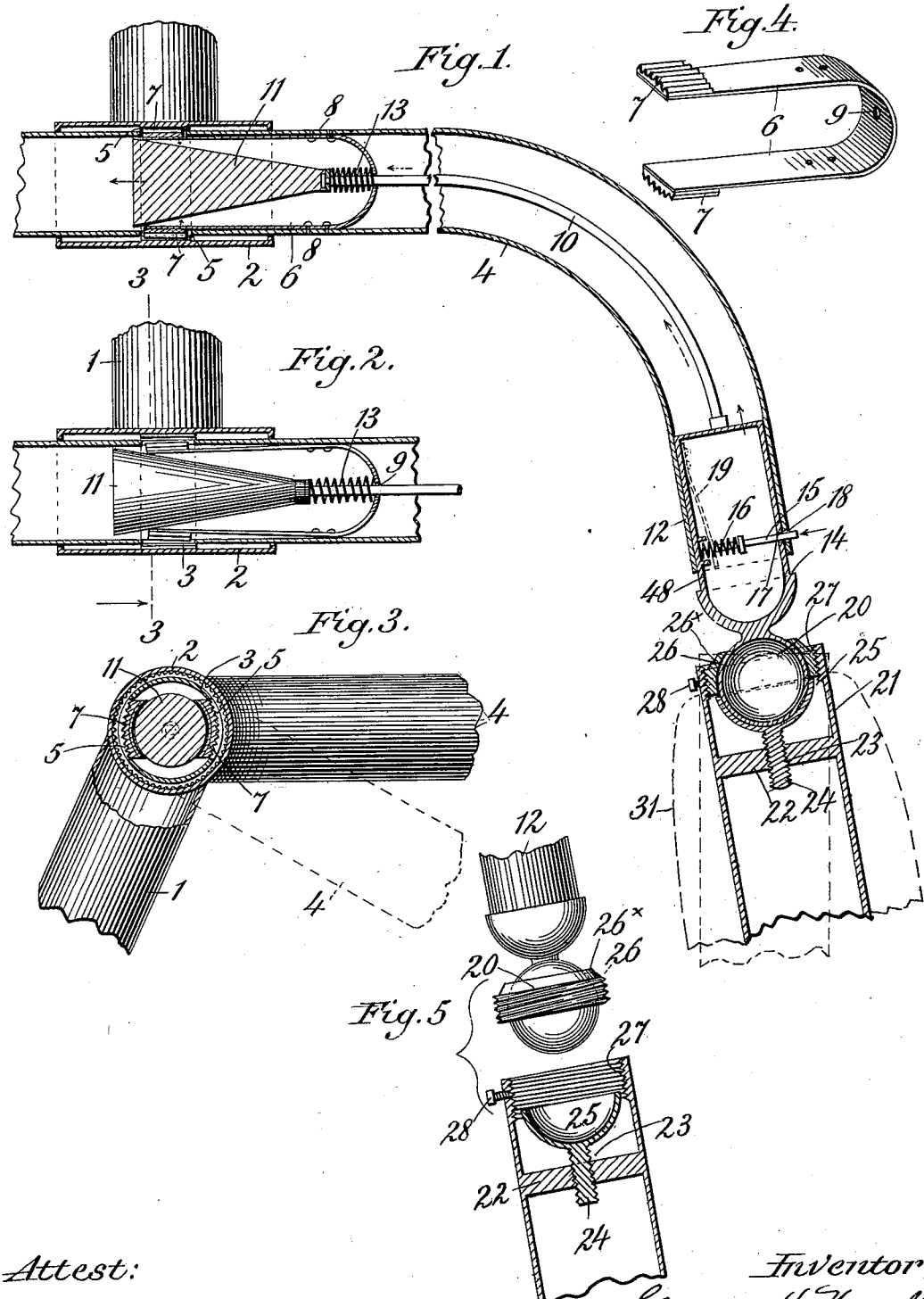

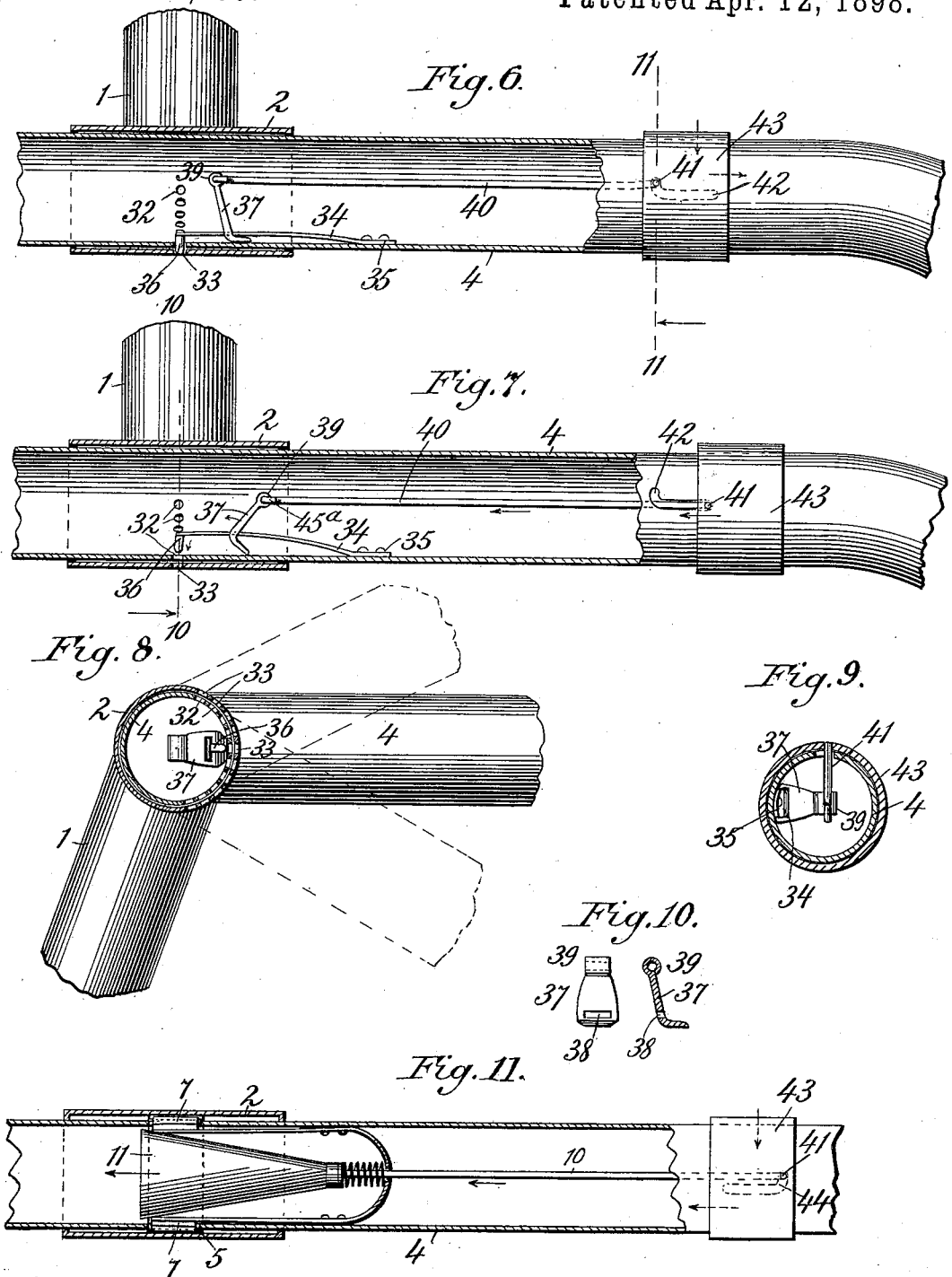

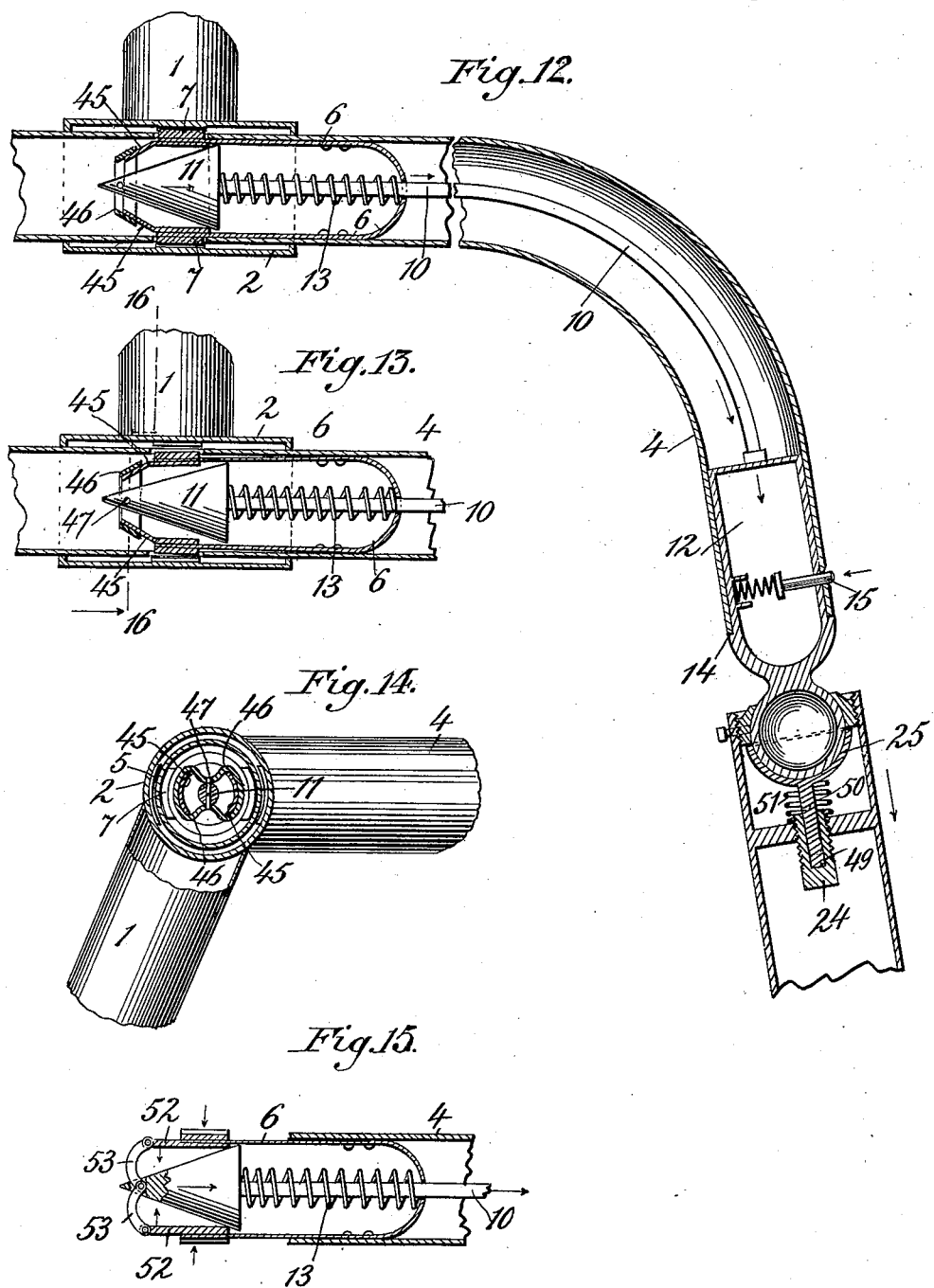

GEORGE H. NEWELL, OF GLOUCESTER, MASSACHUSETTS.

BICYCLE HANDLE-BAR AND HANDLE.

SPECIFICATION forming part of Letters Patent No. 602,095, dated April 12, 1898.

Application filed January 27, 1896. Serial No. 577,015. (No model.)

*To all whom it may concern:*

Be it known that I, GEORGE H. NEWELL, a citizen of the United States, residing at Gloucester, in the county of Essex and State of Massachusetts, have invented certain new and useful Improvements in Bicycle Handle-Bars and Handles; and I do hereby declare the following to be a full, clear, and exact description of the invention, such as will enable others skilled in the art to which it appertains to make and use the same.

My invention relates to bicycles, and more particularly to improvements in bicycle handle-bars and handles.

The primary object of the invention is to provide a handle-bar with means for effecting a rotary adjustment thereof within its bearing on the center-post of the machine without the aid of a wrench or similar implement and to permit an independent adjustment of the handles with relation to the handle-bar.

A further object of the invention is to provide improved devices for effecting a variety of adjustments of the handle-bar and handles, adapted to be easily operated by the hand of the rider while the machine is traveling and which shall be concealed within the handle-bar to avoid an unsightly appearance or cumbersome construction.

The accompanying drawings illustrate embodiments of my improvements; but my invention includes any construction embraced within the terms of the appended claims.

Figure 1 is a horizontal section of a portion of a bicycle handle-bar and handle, showing one form of mechanism embodying my improvements, the parts being in locked position. Fig. 2 is a detail view showing the handle-bar-locking devices in elevation in their unlocked position. Fig. 3 is a section on the line 3 3 of Fig. 2. Fig. 4 is a perspective view of the locking-spring of the handle-bar detached. Fig. 5 is a detail view, partly in section, of the handle securing and adjusting devices. Figs. 6 and 7 are sectional views of a modification of the handle-bar-locking mechanism in locked and unlocked positions, respectively. Fig. 8 is a section on the line 10 10 of Fig. 7. Fig. 9 is a section on the line 11 11 of Fig. 6. Fig. 10 illustrates details of the locking-lever shown in Figs. 6 and 7. Fig. 11 is a sectional view of a further modification. Fig. 12 is a horizontal sectional view of a modified form of the device in which the expanding and locking cone is in a position reverse to that shown in Fig. 1. Fig. 13 illustrates the locking devices of Fig. 12 in unlocked position. Fig. 14 is a section on the line 16 16 of Fig. 13, and Fig. 15 shows in section a modification of the means for throwing the teeth of the locking-spring shown in Figs. 12 and 13 into and out of engagement with the serrations of the central bearing.

The reference-numeral 1 indicates the standard or center-post of the machine, provided with a T-head or horizontal sleeve-bearing 2, that is formed interiorly with an annular series of teeth or serrations 3, arranged parallel to the length of the bearing.

4 indicates the handle-bar, of hollow cylindrical form, supported in the bearing 2 and provided centrally with diametrically opposite openings 5.

Within the hollow handle-bar 4 is arranged a locking device comprising, preferably, a flat spring 6, bent upon itself and provided on the outer sides of its ends with teeth or serrations 7, adapted to project through the openings 5 and engage the teeth 3 of the sleeve 2. This spring 6 is secured to the handle-bar by interior rivets 8 at one side of the center of the bar, so that its toothed free ends 7 will be opposite the teeth of the sleeve. The spring 6 is provided with an opening 9 at the center of its bend, through which extends a pull-rod 10, secured at its inner end to a wedge that is preferably in the form of a cone 11 and at its outer end to a sliding sleeve 12, located in the end of the handle-bar. The cone 11 is arranged between the arms of the bent spring 6, and a coil-spring 13 reacts between the outer or small end of the cone and the bend in the spring, as shown in Figs. 1 and 2.

The sleeve 12 is adapted to move freely within the end of the handle-bar and is provided with an annular shoulder 14 to limit the inward movement of the sleeve. The sleeve is provided with a locking-pin 15, the inner end of which is secured to one end of a coil-spring 16, the opposite end of the spring being secured to the wall of the sleeve 12. The outer end of the pin 15 projects through an opening 17 in the sleeve 12 and through a registering opening 18 in the handle-bar.

If preferred, a chain or other flexible connection may be used instead of the rod 10, and a flat spring 19, as indicated in dotted lines in Fig. 1, may be employed with the pin 15 instead of the coil-spring 16.

Projecting from the sleeve 12 and preferably formed integral therewith is a ball 20, to which the handle 21 is adjustably secured in a manner presently to be described. The handle is hollow and provided with a transverse partition 22, having a threaded opening 23, which receives the threaded stem 24 of a semispherical socket 25, which serves as a seat for the ball 20 and operates to clamp the same, as will be explained. After the ball is in place within the handle it is retained against displacement by a ring 26, the periphery of which is screw-threaded to engage threads 27, formed on the interior of the handle adjacent to the end thereof. The ring 26 is located on the opposite side of the center of the ball from the socket and is curved or hollowed out to conform to the contour of the ball and may be provided with an annular flange or collar $26^\times$, adapted to be grasped by the fingers. If desired, a set-screw 28 may extend through the handle and impinge against the retaining-ring to prevent accidental displacement when the parts are tightened up. In lieu of the threaded ring 26 I may bend the inner end of the handle to form an annular retaining lip or flange after the ball is inserted into the handle.

The handle is provided with a cover 31, of cork or similar material, as shown by dotted lines in Fig. 1.

The operation of the mechanism thus described is as follows: Normally the parts are in the positions shown in Fig. 1, the cone 11 being drawn outwardly against the tension of the spring 13 to expand the toothed ends of the spring 6 and force their teeth 7 through the openings 5 of the handle-bar and into locking engagement with the teeth 3 of the sleeve 2. The spring-pressed pin 15 retains the parts in this locked position and the handle-bar is held firmly. When it is desired to adjust the handle-bar, the rider depresses the pin 15 with his finger until said pin is disengaged from the handle-bar, thus allowing the spring 13 to expand and throw the cone 11 to the position shown in Fig. 2. The toothed ends of the bent spring 6 then spring out of engagement with the teeth of the central sleeve 2, permitting the handle-bar to be rotated. It will be apparent that the expansion of the coil-spring 13 also operates to draw the connection 10 and the sleeve 12 toward the center of the bar, the inward movement of the sleeve being limited by the contact of its shoulder 14 with the end of the handle-bar. After the desired adjustment of the handle-bar is effected the parts are locked in their adjusted position by an outward pull on the handle to return the pin 15 to its engagement with the opening 18 in the handle-bar and the cone to the position shown in Fig. 1.

The handles are adjusted with relation to the handle-bar and locked in their adjusted position as follows: The parts being in the position shown in Fig. 1, the handle is pressed forward to force the socket 25 firmly against the ball, so that the frictional contact between the ball and socket will exceed that between the screw and the threads of the opening 23. By then turning the handle the retaining and clamping ring 26 in the end of the handle, which forms one member of the clamp of which the socket forms the other, is drawn rearwardly to clamp the ball between it and the socket 25, the handle with its threaded partition and the ring 26 turning upon the threaded stem of the socket 25, the latter being held stationary by the friction between the socket and ball caused by the pressure upon the handle. A reverse turn of the handle will loosen the ball.

In Figs. 6 to 10, inclusive, I have illustrated a modified form of locking mechanism which operates in substantially the same manner as the mechanism above described. In this form of my improvement I provide the central bearing-sleeve 2 with a series of holes 32, arranged in the same vertical plane and extending approximately half-way around the sleeve. The handle-bar 4 is also provided with a series of openings 33, registering with the holes 32. In lieu of the bent spring 6 and cone 11 shown in Figs. 1 and 2 I employ a flat spring 34, secured within the handle-bar by rivets 35 and provided at its free end with a dog 36, adapted to enter the holes 32 and 33 of the sleeve and handle-bar and lock them together in various positions of adjustment.

37 indicates a bell-crank lever arranged within the handle-bar and provided near its angle point with a transverse slot 38, through which the spring 34 extends. The upper end of the lever is pivotally secured in any preferred manner to the inner end of a pull-rod 40, the outer end of said rod 40 being provided with a pin 41, projecting at right angles from the rod and working in a curved slot 42 of the handle-bar. A ferrule or sliding sleeve 43 surrounds the handle-bar and is secured to the outer end of the pin 41 to serve as a convenient finger-piece for manipulating the pull-rod 40 and to close and conceal the slot when the parts are in normal position. The lever 37 is supported and maintained in position by the spring 34 passing through it and its pivotal connection with the pull-rod. The upper end of said lever is provided with an eye 39 to receive the hooked end $45^a$ of the pull-rod 40. Any suitable pivotal connection between the lever and pull-rod may, however, be employed.

As shown in Fig. 6, the handle-bar is in locked position. When it is desired to adjust the bar radially, the sleeve or ferrule 43 is turned slightly to disengage the pin 41 from the curved end of the slot 42, and the rod 40 may then be pulled outwardly, as shown in Fig. 7, to withdraw the spring-dog from the holes in the sleeve 2 and bar 4. The sleeve 43 is held by the hand against the tension of the spring 34 until the handle-bar is adjusted, when by releasing it the force of the spring 34 throws the dog again into locking engagement with the bar and its supporting-sleeve. It will be noted that in this modified form of locking device the action of the retracting-spring is the reverse of that first described, since in the mechanism shown in Figs. 1, 2, and 3 the spring 13 is normally contracted to lock the posts, while in the form illustrated in Figs. 6 to 10 the unlocking is effected against the tension of the spring 34. Thus in one instance the handle-bar is locked by a pull on the rod 10 and in the other case by a reverse or inward movement of the rod.

In Fig. 11 I have illustrated the toothed spring 6 and cone 11 combined with the ferrule 43 and curved slot for the pin 41 instead of the push-pin 15 shown in Fig. 1. In this embodiment of the invention the curve or angle 44 of the slot in the handle-bar is at the outer end of the slot instead of at the inner end thereof, as shown in Figs. 6 and 7. This is necessary in order to retain the cone 11 in its locked relation with the spring 6. Also, in this form of the invention it may be preferable to connect the pull-rod and cone together pivotally to facilitate turning said rod.

In Figs. 12, 13, and 14 the locking devices are so arranged that they operate to lock the handle-bar by the expansion of the spring 13 instead of by its contraction, as in Figs. 1 and 2, and by an inward movement of the connection 10 and its sliding sleeve 12 instead of by an outward pull upon the sleeve 12. This is accomplished by reversing the cone in its relation to the spring 6 and rod 10 and securing the inner end of the rod to the larger end or base of the cone and providing the toothed ends of the spring 6 with oppositely-inclined projecting flanges 45, adapted to be engaged by a spanning-yoke 46, bent inwardly at opposite sides and secured by a pin 47 to the point or apex of the cone. This spanning device is beveled to conform to the oppositely-inclined flanges of the spring 6. As shown in Fig. 12, the cone is projected between the ends of the spring 6 by the expansion of the spring 13, thus serving to lock the parts. To unlock the handle-bar, it is necessary to pull upon the handle after releasing the catch 15, when the cone will be drawn outward, its spanning-yoke 46 engaging the flanges 45 of the spring 6, thus drawing the ends of the springs 6 out of locking engagement with the teeth of the bearing 2. By this last-described construction the gap or space 48, Fig. 1, between the shoulder 14 of the sliding sleeve and the outer end of the hollow-bar 4 is only visible when the handle-bar is being adjusted, and normally—that is to say, when the parts are in locked position—the shoulder 14 of the sliding sleeve fits snugly against the outer end of the hollow bar 4, as shown in Fig. 12.

In Fig. 12 I have also illustrated an optional feature of addition—the means for securing the socket-bearing 25 within the handle.

In the form of clamping devices for the ball shown in Fig. 1 when the parts are loosened the handle is free to drop to a vertical or depending position, there being no frictional contact to sustain it in operative position. To avoid this, I form the threaded stem 24 of the socket-bearing in two parts, one having a socket 49, that is angular in cross-section and adapted to receive the other part 50, that is also angular in cross-section and projects from the socket-bearing 25. A coil-spring 51 surrounds the stem 50 between the socket 25 and the stem 24 or partition 22. It will be apparent that the spring 51 will hold the socket 25 normally against the ball with sufficient force to keep the handle from falling and that when the handle is to be locked the spring does not interfere with the further pressure by hand of the socket against the ball, the stem of the socket having a longitudinal movement within the squared socket 49 of the screw 24.

In Fig. 15 I have substituted straight parallel extensions 52 for the inclined flanges 45 of the locking-spring, and said extensions are connected to the point or apex of the cone by pivotally-secured arms 53 instead of by the yoke 46 shown in Figs. 12 to 14. The operation of this modified device will be readily understood, it being obvious that the arms 53, pivoted at their inner ends to the cone and at their outer ends to the spring extensions, will cause the ends of the locking-spring to engage or disengage the teeth of the central bearing-sleeve 2 accordingly as the cone is moved by the pull rod or chain.

It is obvious that the adjustment of the handle-bar and handles is accomplished without the use of a wrench or other implement and that the rider may quickly vary the height or inclinations of the handles while the machine is in motion and even without removing his hands from the handles.

It will be understood that both handles of the machine are to be provided with the ball-and-socket coupling; but the ball for the end of the handle-bar (not shown in the drawings) may be formed upon the handle-bar itself instead of upon a sleeve 12, only a single movable sleeve being necessary for manipulating the locking mechanism.

It will also be understood that my improvements may be applied not only to bicycles, but to all forms of cycles employing handle-bars.

Having thus described my invention, what I claim is—

1. The combination in a bicycle, or like machine, of a central supporting-sleeve having internal teeth or serrations, a hollow handle-bar arranged therein and provided with openings, a locking device arranged within the handle-bar and adapted to project through said openings and engage the teeth or serrations on the sleeve, a connection extending substantially to the handle at the end of the bar for operating the locking device in one direction, and a spring for operating said device in the opposite direction; substantially as described.

2. The combination with the supporting-sleeve formed with internal teeth or serrations, and the handle-bar, provided with central openings, of locking devices comprising a toothed or serrated spring, a wedge for causing said spring to engage the serrations in the sleeve, an operating connection, and a catch device for securing the connection when the parts are in locked position; substantially as described.

3. The combination with the central supporting-sleeve and hollow handle-bar, of the toothed locking-spring, a wedge for causing said spring to engage the serrations in the sleeve, a connection secured to said wedge, a retracting-spring for the connection, and a sliding sleeve secured to the outer end of the connection; substantially as described.

4. The combination with the ball projecting from the handle-bar, of a tubular handle provided at its inner end with an inwardly-projecting ring or flange, a socket-bearing within the handle, and a connection between the handle and the bearing whereby the ball may be clamped within the socket by the turning of the handle; substantially as described.

5. In a bicycle, or the like, the combination of the steering-head stem and sleeve, a handle-bar rotatably adjustable in said sleeve, locking devices to secure the bar in different positions of adjustment, actuating mechanism for said locking devices, said mechanism being concealed and protected within the hollow of the bar, and a push-button projecting through a perforation in the handle-bar in proximity to the handle, whereby the actuating mechanism for the locking device may be released by the thumb or finger without disengaging the hand from the handle; substantially as described.

6. In a bicycle, or the like, the combination of the stem or steering-head and its sleeve, a handle-bar rotatably adjustable in said sleeve, locking devices to secure the bar in different positions of adjustment, actuating mechanism for said locking devices, said mechanism being concealed and protected within the hollow of the handle-bar and extending substantially to the handle at the end of the bar, a spring for holding the locking devices normally locked, and a push-button projecting through a perforation in the handle-bar near the handle and connected with said actuating mechanism, whereby the actuating mechanism for the locking devices may be released by the thumb or finger without removing the hand from the handle, and the adjustment of the bar effected while holding the handle; substantially as described.

7. The combination with a ball on the end of the handle-bar, of a handle provided with an internal socket-bearing, a screw-threaded stem for said bearing, a ring secured to the handle and encircling the ball on the opposite side of its center from the socket, and a threaded projection in the handle into which the stem of the socket screws, whereby the socket and the ring are clamped upon the ball; substantially as described.

8. The combination with a ball on the end of the handle-bar, of a handle provided with an internal socket-bearing, a screw-threaded stem for said bearing, said stem being constructed in two parts movable lengthwise only with respect to each other, a ring secured to the handle and encircling the ball on the opposite side of its center from the socket, a spring reacting between the parts of the socket-stem, and a threaded projection in the handle into which the stem screws, whereby the socket and the ring are clamped upon the ball; substantially as described.

In testimony whereof I affix my signature in presence of two witnesses.

GEO. H. NEWELL.

Witnesses:
H. E. PARKER,
T. H. LIBBEY.